United States Patent [19]

Oba et al.

[11] Patent Number: 4,477,555

[45] Date of Patent: Oct. 16, 1984

[54] OPTICAL INFORMATION RECORDING MEDIUM

[75] Inventors: Hideaki Oba, Yokohama; Makoto Kunikane, Chigasaki; Masaakira Umehara, Yokohama; Kiyoshi Tanikawa, Yokohama; Michiharu Abe, Yokohama, all of Japan

[73] Assignee: Ricoh Co., Ltd., Tokyo, Japan

[21] Appl. No.: 402,694

[22] Filed: Jul. 28, 1982

[30] Foreign Application Priority Data

Aug. 1, 1981 [JP] Japan ............................. 56-120935
Aug. 1, 1981 [JP] Japan ............................. 56-120936
Aug. 1, 1981 [JP] Japan ............................. 56-120937
Sep. 8, 1981 [JP] Japan ............................. 56-140280

[51] Int. Cl.$^3$ .......................................... G03C 1/76
[52] U.S. Cl. .................................. 430/273; 430/945;
430/942; 430/296; 430/275; 430/276; 430/277;
430/278; 430/279; 430/524; 430/525; 430/526;
430/271; 346/135.1; 346/76 L
[58] Field of Search ............... 430/945, 942, 296, 273,
430/275, 276, 277, 278, 279, 524, 525, 526, 271;
346/135.1, 76 L

[56] References Cited

U.S. PATENT DOCUMENTS

| | | | |
|---|---|---|---|
| 3,962,513 | 6/1976 | Eames | 430/945 |
| 4,188,214 | 2/1980 | Kido et al. | 430/945 |
| 4,218,689 | 8/1980 | Bloom et al. | 430/945 |
| 4,230,939 | 10/1980 | de Bont et al. | 346/76 L |
| 4,241,355 | 12/1980 | Bloom et al. | 346/135.1 |
| 4,252,677 | 2/1981 | Smith | 430/945 |
| 4,305,081 | 12/1981 | Spong | 430/945 |
| 4,364,986 | 12/1982 | Zwanenburg et al. | 430/945 |
| 4,373,004 | 2/1983 | Asano et al. | 430/945 |

*Primary Examiner*—Won H. Louie
*Attorney, Agent, or Firm*—Flynn, Thiel, Boutell & Tanis

[57] ABSTRACT

An optical information recording medium comprising a substrate and a recording layer superimposed on said substrate, said recording layer comprising a reflective layer in which metal particles with a particle diameter of 1500Å or less have been distributed closely and a light absorptive layer in which metal compounds and a very small amount of metal particles with a particle diameter of 200–2000Å have been dispersed uniformly or substantially uniformly in the volume ratio of 1–30% in a resin.

13 Claims, 7 Drawing Figures

OPTICAL INFORMATION RECORDING MEDIUM

BACKGROUND OF THE INVENTION (a) Field of the Invention

The present invention relates to the optical information recording medium, in particular relates to the optical information recording medium suitably used in writing and reading with a high density energy beam such as laser beam wherein the recording layer superimposed on the substrate has been divided into the reflective layer and the light absorptive layer.

(b) Description of the Prior Art

A great number of optical information recording mediums for use in writing and reading with a high density energy beam (for instance, laser beam) have been developed up to the present. As the typical ones there can be enumerated the recording medium prepared by providing the vapor deposition film of metal, semimetal or nonmetal on the substrate and the recording medium prepared by coating silver halide emulsion onto the substrate and heating same to thereby form the reflective layer thereon (Japanese Laid Open Patent Application No. 108995/1980).

As the recording layers (said vapor deposition films or reflective films) for use in laser recording mediums there are known (1) thin metal films with holes melt-formed by radiation of laser beam, (2) composite lustrous vapor deposited films whose reflective index is reduced at some spots by radiation of laser beam, (3) thin films of dyes or other coating agents that can be removed at some spots by radiation of laser beam and (4) dielectric substances in which the refractive index is varied at some spots by radiation of laser beam and light diffusion is caused when it is scanned by a reading laser beam.

However, the recording mediums using vapor deposited films of metal, semimetal or nonmetal, which are generally prepared by a vacuum molding method of the batch type rather than the continuous type, are defective in that they are expensive and further it is difficult to attain a uniform quality of them, when masspro-duced, because a number of batches are used therein. On the other hand, the process of forming the reflective layer by coating silver halide emulsion onto the substrate and heating same is troublesome in the necessity of pre-coating silver halide emulsion onto the substrate, involves the problem of carrying out the heat treatment at a temperature of 300° C. or more, and further the recording medium prepared by this process is defective in that it is difficult to form the reflective layer of a uniform silver density because the silver density gradient is designed to fall from the reflective layer surface toward the substrate when viewed from the relation between the reflective layer and the light absorptive layer, and it is difficult to obtain the light absorptive layer of a uniform quality because the aforesaid tendency is also observed in the light absorptive layer.

SUMMARY OF THE INVENTION

It is an object of the present invention to provide an optical information recording medium which is free from the above mentioned disadvantages and has a recording layer consisting of a reflective layer and a light absorptive layer divided from each other. It is another object of the present invention to provide an optical information recording medium capable of recording and reading with a high density energy beam, wherein a recording layer recordable on one side or both sides can be formed through one process.

In other words, the optical information recording medium according to the present invention is characterized by comprising a substrate and a recording layer, superimposed thereon, that is comprised of a reflective layer in which metal particles with a particle diameter of 1500 Å or less have been distributed closely and a light absorptive layer in which metal compounds and a very small amount of metal particles with a particle diameter of 200-2000 Å have been dispersed uniformly or substantially uniformly in the volume ratio of 1-30% in a resin.

Figure 1:
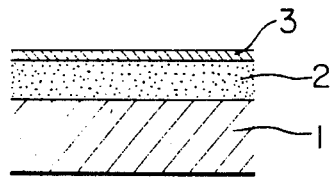
FIG. 1 to FIG. 5 are sectional views illustrating five embodiments of the typical basic constructions of the recording medium according to the present invention.

Referring to the reference numerals applied to these drawings, 1 denotes a substrate, 2 denotes a light absorptive layer, 3 denotes a reflective layer, 4 denotes an undercoat, 5 denotes an overcoat, 11 denotes a spacer and 23 denotes the conventional recording layer.

DETAILED DESCRIPTION OF THE PREFERRED EMBODIMENTS

As the high density recording processes of image information there are known the processes where recording is attained in the manner of causing dot-like changes in the recording medium (more correctly, the recording layer) using a high density energy beam such as laser beam. The recording medium according to the present invention can be used with extreme effect in such recording systems.

Figure 5:
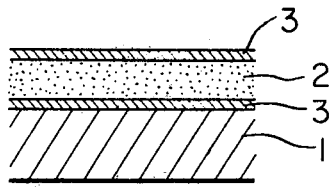
Figure 3:
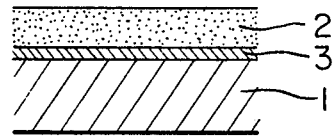

The most basic layer constructions of the recording medium according to the present invention are as shown in FIG. 1, FIG. 3 and FIG. 5. The recording layer of the recording medium according to the present invention is consisted of the light absorptive layer 2 and the reflective layer 3. And, the recording layer is superimposed on the substrate (support) 1.

The substrate 1 referred to herein includes glass plate, metal plate, heat resisting resin plate and the like. As metals for use in the metal plate there can be enumerated aluminum, stainless steel, copper, iron, yellow copper, gold, silver, platinum, tin (or tin plate), lead, zinc (or sheet zinc) and the like. As resins for use in the heat resisting resin plate there can be enumerated acrylic resin, polycarbonate resin, polysulfone, polyimide, polybenzoimidazole, polyimidazopyrrolone and the like. Among them, polysulfone and polyimide are more preferable because they are free from deformation caused by heat treatment in the preparation of the recording medium.

Figure 4:
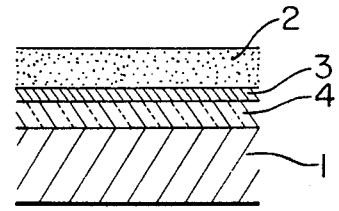

In this connection, it is to be understood that the substrate 1 may be transparent or not, but in the recording medium of the type where recording is effected by making a high density energy beam such as laser beam or the like penetrate the substrate 1 and radiate the recording layer (for instance, the recording mediums as shown in FIG. 3, FIG. 4 and FIG. 5), it is necessary that the substrate 1 be transparent to the high density energy beam used herein and further be strong enough to withstand said beam.

Figure 2:
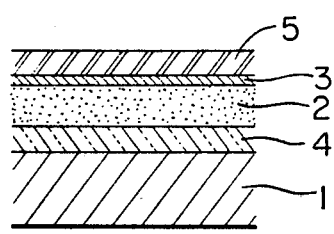
Figure 6:
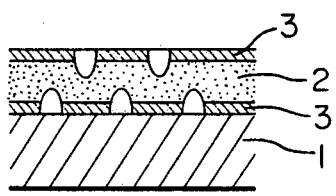
FIG. 6 is a sectional view illustrating the state of having recorded information in the recording medium of FIG. 5.

In the recording medium of the type where the light absorptive layer 2 contacts with the substrate 1 (in particular, where the substrate 1 is made of a metal plate), it is effective to interpose an undercoat 4 between the substrate 1 and the light absorptive layer 2 as illustrated in FIG. 2. The undercoat 4 referred to herein may be transparent or not to a high density energy beam.

Taking thermal conductivity into account, it is possible to form the undercoat 4 using a heat insulating resin material or an inorganic material applied in a usual manner, such as vapor deposition, coating or the like. The resins used herein may include vinyl chloride resin, vinyl acetate resin, acrylic or methacrylic resin, polyester such as polyethylene terephthalate celluloses such as nitrocellulose and the like, polyamide, polycarbonate, epoxy resin, polyimide, polysulfone and the like, but are required to be able to endure for at least the temperature for drying a recording layer-forming solution. Further, as the inorganic compound used herein there can be enumerated SiO, $SiO_2$, $TiO_2$ and the like. Among them, polyimide and polysulfone are used more preferably. The thickness of the undercoat 4 is in the range of about 0.05–10 $\mu$m, preferably about 0.1–0.5 $\mu$m.

In the recording medium of the type where the reflective layer 3 is exposed, it is desirable to provide an overcoat 5 as shown in FIG. 2. The overcoat 5 may be formed of either an organic material or an inorganic material provided that it can be penetrated by a high density energy beam, is of a high mechanical strength, does not react with the reflective layer 3 and is of a superior film-forming property. Concrete examples of said organic material are as given in Japanese Laid Open Patent Application Nos. 96716/1974; 59626/1976; 75523/1976; 88024/1976; and 134633/1976. Among them, polystyrene and polyethylene terephthalate are used more profitably. The inorganic material specifically includes $Al_2O_3$, $SiO_2$, SiO, MgO, ZnO, $MgF_2$, $CuF_2$ and the like.

This overcoat 5 may be formed in a usual manner such as vapor deposition, coating or the like, and the suitable thickness thereof is in the range of about 0.1–10 $\mu$m, preferably about 0.5–1.0 $\mu$m.

The recording mediums shown in FIG. 3 and FIG. 4 are of the type where the light absorptive layer 2 is exposed and the reflective layer 3 contacts with the substrate 1 directly or through the undercoat 4. Accordingly, in the recording medium of this type, as stated previously, the substrate 1 must be transparent to a high density energy beam (must permeate a high density energy beam).

The undercoat 4 referred to herein is effective in the points of reducing the heat transmission from the recording layer to the substrate 1 to thereby increase the writing sensitivity and further reducing the unevenness of the substrate surface. This undercoat 4 illustrated in FIG. 4 is exactly the same as the undercoat 4 illustrated in FIG. 2 excepting for the fact that the undercoat 4 illustrated in FIG. 4 must be transparent to a high density energy beam.

Figure 7:
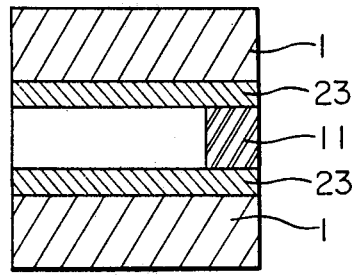
FIG. 7 is a sectional view of the conventional duplex recording medium.

The recording mediums shown in FIG. 1 to FIG. 4 are used for one-sided recording, while the recording medium shown in FIG. 5 is used for double-sided recording. The recording medium shown in FIG. 5 is different from the conventional double-sided recording medium shown in FIG. 7 in that the former is one prepared by forming a mono-recording layer on a sheet of substrate 1 wherein reflective layers 3 and 3 are placed on the surface side (upper layer) and the substrate side (lower layer) of said recording layer and a light absorptive layer 2 is interposed between these reflective layers 3 and 3.

As can be seen readily from the above explanation, in the case of the recording medium shown in FIG. 5, needless to say, a substrate 1 must be transparent to a high density energy beam and it is possible, if necessary, to interpose the undercoat 4 as shown in FIG. 4 between the substrate 1 and the reflective layer 3 on the substrate side or to superimpose the overcoat 5 as shown in FIG. 2 on the reflective layer 3 on the surface side.

It is to be noted that the optical information recording mediums (as illustrated in FIG. 1 to FIG. 5) according to the present invention are most characterized by the recording layer comprising the light absorptive layer 2 and the reflective layer 3 (or 3,3).

In more detail, the reflective layer 3 is in such a state that metal particles having a particle diameter of 1500 Å or less, preferably 150–1500 Å (average particle diameter: about 500 Å) have been closely, plainly distributed so that the percentage of metal particles occupying per unit surface area of the reflective layer may be 60–98%, preferably 70–90%. The "plainly distributed state" referred to herein means that metal particles have been distributed across the surface of the reflective layer in the right and left transverse directions but not in the longitudinal direction so that they do not lie one upon another. However, this is an ideal. In practice, it will suffice if the metal particles are distributed so as to extend in the transverse directions and to maintain said percentage of occupation per unit surface area as a whole, regardless of whether some metal particles lie one upon another in a direction perpendicular to the surface.

In this connection, however, there is a necessity of drawing a clear line between the percentage of metal particles occupying per unit surface area of the reflective layer 3 and the volume ratio (1–30%) of the sum total of metal particles and metal compounds in the light absorptive layer 2 referred to afterwards. The reflective layer 3, as mentioned above, is composed mainly of metal particles, the balance being a binder resin.

In case the diameter of the metal particles in the reflective layer 3 is greater than 1500 Å, the reading out and writing operations are hindered, while in case the said percentage of metal particles per unit surface area of the reflective layer is less than 60% the writing and reading out characteristics are deteriorated and in case said percentage is greater than 98% it is undesirable because a large amount of energy is required for writing.

The light absorptive layer 2 is in such a state that metal compounds and metal particles with a particle diameter of 200–2000 Å (average particle diameter: about 700 Å) have been distributed uniformly or substantially uniformly in a binder resin so that the total sum of said metal compounds and metal particles may have a volume ratio of 1–30%, preferably 2–10%. The amount of metal particles contained in the light absorptive layer 2 is very small.

In case said value is less than 1% the light absorptive layer 2 can not absorb the high density energy beam, while in case it is greater than 30% the writing characteristic is deteriorated.

Referring to the binder resins used in the reflective layer 3 and light absorptive layer 2, it can be understood from the explanation of the manufacturing process of the recording medium to be made afterwards that the binder of the same kind is used in one recording layer. As the suitable binder resins there are enumerated water-soluble resins, for instance, such as polyvinyl alcohol, polyvinyl pyrrolidone, polyacrylic acid, polyacrylamide and the like; and water-insoluble resins such as polyvinylbutyral, cellulose acetate and the like. These resins may be used above or in combinations of two kinds or more. However, the water-insoluble resins are unsuitable for the manufacture of the recording mediums as shown in FIGS. 3, 4 and 5.

The metals for use in said metal particles include Ag, Au, Cu, Pd, Fe, Co, Ni, Ti, V, Si, Ge, Be, Th, Mn, Pt, Rh, Ir, Tc, Re, Ru, Os, Mo, Ta, Al, In, Sn, Se, Te, Cr, Bi, Hf, Y, Nd, Zr, W, Zn, Mg, Sc, Nb, La, Pr and the like. Among them, Ag and Au, especially Ag is effective.

Further, said metal compounds include silver nitrate, silver potassium cyanide, gold potassium cyanide, silver ammine complex, silver cyan complex, gold salt or gold cyan complex, nickel sulfate copper sulfate, palladium chloride, hexaammine cobalt salt, potassium ferricyanide, ferrous chloride, ferric chloride, zinc sulfate, and the like.

As the means for manufacturing the recording medium according to the present invention there can be contemplated a process which comprises first providing the light absorptive layer 2 (or reflective layer 3) on the substrate 1 and further providing the reflective layer 3 (or light absorptive layer 2) thereon and the like. However, it is impossible for these processes to produce the recording medium according to the present invention. The reason resides in that the metal particles of which the reflective layer 3 is composed have a very small particle diameter such as 1500 Å or less (average particle diameter: about 500 Å) and it is difficult in a usual manner to form the reflective layer 3 very thinly by using such fine metal particles in the amount occupying 60-98% per unit surface area of the reflective layer. In addition thereto, it is difficult to obtain very fine metal particles per se having a particle diameter of 1500 Å or less, and even if obtainable, it is substantially impossible to form the reflective layer 3 in the manner of dispersing such metal particles in a resinous solution and coating the resulting dispersion and drying.

Accordingly, the recording layer of the recording medium according to the present invention is formed for instance by allowing a metal compound to coexist with a reducing agent in a resinous solution, dissolving same to obtain a solution, and maintaining said solution at a proper temperature condition to thereby reduce said metal compound with said reducing agent for separating fine particle-like metal on the interface.

The reducing agents suitably used herein include formalin, tartaric acid, tartrate, reducing sugar, hypophosphite, sodium boron hydride, dimethylamine borane and the like.

This process of forming the recording layer will be explained more concretely hereinafter. The aforesaid metal compound and reducing agent are dissolved in the resin by the use of water or a suitable solvent. The suitable amount of the metal compound against the resin (binder resin) is 0.1-10, preferably 0.5-1.5 in terms of wt.%. And, the amount of the reducing agent is suitably in the range of 0.5-10 moles, preferably 2-4 moles per mole of the metal compound.

The thus prepared recording layer-forming solution is coated on the substrate 1 or on the undercoat 4, whereby there is formed a recording layer precursor. The solid concentration in this recording layer-forming solution is about 5-70 wt.%, preferably about 10-50 wt.%. And, coating of this forming solution may be done, by means of a generally prevailing film forming means such as brush-coating, roller-coating, flow-coating, rotation-coating, spray-coating or the like.

The recording layer precursor is dried for forming the recording layer consisting of the light absorptive layer 2 and the reflective layer 3, wherein the thickness of coated film of the recording layer precursor is regulated so that the thickness of the recording layer may be in the range of 0.1-10 $\mu$m, preferably 0.5-2 $\mu$m.

As the heating means effective for drying the recording layer precursor, namely for the formation of the recording layer there can be enumerated a convection oven, contact heat source, panel heating and the like. The heating temperature is influenced by the composition or components (compounding ratios of components) of the recording layer-forming solution and further widely influenced by the difference in the construction of the recording layer.

When intending to form the recording layer wherein the reflective layer 3 is located on the surface side thereof as shown in FIG. 1 and FIG. 2, heating of the recording layer precursor may be effected at a time at a temperature of 150° C. or more, preferably in the range of 200-250° C. Heating must be continued at least until the reflective layer 3 comprising metal particles is formed on the surface of the recording layer.

When intending to form the recording layer wherein the reflective layer 3 is located on the back side thereof as shown in FIG. 3 and FIG. 4, heating of the recording layer precursor may be effected in the manner of firstly drying it at a temperature of 50-150° C., preferably 50-100° C. and thereafter secondly drying it at a temperature of 100-250° C., preferably in the range of 150-200° C. In this instance, the first heating may be effected to such an extent that the surface of the recording layer, when lightly touched by hand, does not stick thereto, while the second heating must be continued at least until the reflective layer 3 comprising metal particles is formed on the back of the recording layer (namely, on the substrate 1 or the undercoat 4).

Although the reason why employment of the above mentioned heating conditions permits to form the reflective layer 3 comprising metal particles on the surface or back of the recording layer has not been investigated minutely, it is deemed that one or two or more metal particles separate on the interface and act as the nucleus of the metal particle layer, namely, the reflective layer 3, whereby the reflective layer 3 is formed. The separation of fine metal particles is also observed in the light absorptive layer 2, but the amount thereof is very small. And, it is considered that in the light absorptive layer 2 there are present (i) metal compounds that have not taken part in the reduction reaction, (ii) metal oxides resultant from heat change of said metal compounds (i) at the time of forming the recording layer, (iii) reducing agent that has not taken part in the reduction reaction, (iv) a certain kind of compound resultant from heat change of said reducing agent (iii) at the time of forming the recording layer and (v) some kind of compounds resultant from reduction of metal compounds by the reducing agent. However, the amounts of (ii), (iii), (iv) and (v) contained are considered very small. These (i), (ii), (iii), (iv) and (v) come to disperse, in like manner as said fine metal particles, uniformly or substantially uniformly in the binder resin as it becomes hardened Next, when intending to form the recording layer wherein reflective layers 3 and 3 are located on both sides of the recording layer with the light absorptive layer 2 interposed therebetween as shown in FIG. 5, heating of the recording layer precursor may be effected in the manner of firstly drying it at a temperature of 50–150° C., preferably 50–100° C. and thereafter secondly drying it at a temperature of 150° C. or more, preferably in the range of 180–300° C. In this instance, the first heating may be effected so as to dry the recording layer to such an extent that the surface of the recording layer, when lightly touched by hand, does not stick thereto, while the second heating must be continued at least until the reflective layers 3 and 3 comprising metal particles are formed on the surface and back of the recording layer (namely, on the substrate 1 or the undercoat 4). When such heating conditions are employed, there can be observed separation of metal particles on two interfaces. The state of the light absorptive layer 2 in the recording layer illustrated in FIG. 5 is the same as previously stated.

These constructions of the recording layer as shown in FIGS. 1 and 2; FIGS. 3 and 4; and FIG. 5 are formed through the heating operations as mentioned above respectively. In this connection, it is to be noted that although the heating conditions for the formation of recording layers shown in FIGS. 3 and 4 and FIG. 5 respectively overlap partly as is evident from the aforegoing description and so seem to be contradictory, in fact there is no fear of causing disadvantages. The reason is that the reaction conditions and the like get changed depending upon the differences in materials used and their mixing percentages. Accordingly, when preparing a recording layer using the same material and under the same heating condition there is obtained either one illustrated in each of FIGS. 3 and 4 or one illustrated in FIG. 5.

When the heating operation has thus finished, the reflective layer 3 (or 3 and 3) comes to take the form of a mirror which has a metallic luster and displays a high reflective index.

In preparing the optical information recording medium of the present invention referred to heretofore, there can be employed both the batch type system and the continuous system. This recording medium may be made into a disc, rectangle (including a regular square) or belt form.

When writing in the recording medium according to the present invention, as usual, a high density energy beam (for instance, laser beam) may be radiated in the direction from the reflective layer 3 to the light absorptive layer 2, whereby holes are perforated in the reflective layer 3 and recording is made. In the case of the recording medium illustrated in FIG. 5, information may be recorded on both sides. This is because when recording is made on the surface side of the recording medium it exerts no influence upon the reflective layer 3 on the side of the substrate 1, while when recording is made on the side of the substrate 1 of the recording medium it exerts no influence upon the reflective layer 3 on the surface side. The reason why "the recording operation exerts no influence" like this consists in that said high density energy beam has been absorbed mainly by the light absorptive layer 2.

In order to read out the recording medium, a low output-high density energy beam is radiated onto said recording medium and reading may be done from changes in the amount of beam reflected from or permeated through the recording medium. In case reading is done from changes in the amount of beam permeated through the recording medium, as stated previously, the substrate 1 and undercoat 4 must be transparent to the high density energy beam used as well as passes the strength sufficient to withstand said beam.

EXAMPLES

Example 1

| | |
|---|---|
| Polyvinyl alcohol | 1 g |
| Water | 9 g |
| Silver nitrate | 1 g |
| 28% ammonia water | 1 ml |
| 35% formalin solution | 0.1 ml |

The solution having the above composition was coated on an optically polished glass by means of rotation-coating method to thereby obtain a recording layer precursor. This precursor was treated for 10 minutes on a plate heated to 200° C. to thereby form a recording layer having a thickness of about 1.2 μm. Thus, there was obtained a recording medium (our product 1) of the type shown in FIG. 1.

Example 2

| | |
|---|---|
| Polyvinyl alcohol | 1 g |
| Water | 9 g |
| Silver nitrate | 2 g |
| Grape sugar | 1.5 g |

The solution having the above composition was coated in the exactly same manner as Example 1 to thereby obtain a recording layer precursor. This precursor was treated for 20 minutes in an oven maintained at 150° C. to thereby form a recording layer having a thickness of about 1.3 μm. Thus, there was obtained a recording medium (our product 2) of the type shown in FIG. 1.

Example 3

| | |
|---|---|
| Polyvinyl pyrrolidone | 2 g |
| Water | 8 g |
| Silver potassium cyanide | 0.5 g |
| Sodium tartrate | 0.6 g |

The solution having the above composition was coated a glass substrate by means of dipping method to thereby obtain a recording layer precursor. This precursor was treated for 15 minutes on a plate maintained at 250° C. to thereby form a recording layer having a thickness of about 0.9 μm. Thus, there was obtained a recording medium (our product 3) of the type shown in FIG. 1.

Example 4

| | |
|---|---|
| 5% aqueous polyacrylamide solution | 10 g |
| Copper sulfate | 0.4 g |

| -continued | |
|---|---|
| 28% ammonia water | 2 ml |
| Sodium boron hydride | 0.3 g |

The solution having the above composition was coated on a glass substrate by means of rotation-coating method to thereby obtain a recording layer precursor. This precursor was treated for 5 minutes in a high temperature furnace maintained at 350° C. to thereby form a recording layer having a thickness of about 0.7 μm. Thus, there was obtained a recording medium (our product 4) of the type shown in FIG. 1.

Example 5

| Polyvinyl pyrrolidone | 1 g |
|---|---|
| Water | 9 g |
| Silver nitrate | 1.5 g |
| 28% ammonia water | 1.5 ml |
| Sodium tartrate | 1.2 g |

The solution having the above composition was coated on a glass substrate, provided previously with an undercoat having a thickness of about 2 μm by coating polycarbonate resin thereon, and same was heated for 5 minutes on a plate maintained at 200° C. to thereby form a recording layer having a thickness of about 1.1 μm. Further, this recording layer was coated with a toluene solution of polystyrene and dried to thereby form an overcoat having a thickness of about 1 μm. Thus, there was obtained a recording medium (our product 5) of the type shown in FIG. 2.

Example 6

| Polyvinyl alcohol | 1 g |
|---|---|
| Water | 9 g |
| Silver nitrate | 2 g |
| 28% ammonia water | 2 ml |
| Grape sugar | 1 g |

The solution having the above composition was coated on a glass substrate by means of rotation-coating method to thereby obtain a recording layer precursor. This precursor was dried in an oven maintained at 50° C., and further heated for 20 minutes on a plate heated to 110° C. to thereby form a recording layer having a thickness of about 1.4 μm. Thus there was obtained a recording medium (our product 6) of the type shown in FIG. 3.

Example 7

| Polyvinyl alcohol | 0.8 g |
|---|---|
| Water | 9 g |
| Gold potassium cyanide | 1.5 g |
| Sodium tartrate | 0.2 g |

The solution having the above composition was coated in the same manner as Example 6 to thereby obtain a recording layer precursor. This precursor was dried in an oven (60° C.) and further heated for 15 minutes on a plate heated to 150° C. to thereby form a recording layer having a thickness of about 0.7 μm. Thus, there was obtained a recording medium (our product 7) of the type shown in FIG. 3.

Example 8

| Polyvinyl pyrrolidone | 2 g |
|---|---|
| Water | 8 g |
| Silver nitrate | 0.5 g |
| Sodium boron hydride | 0.2 g |

The solution having the above composition was coated in the same manner as Example 6 to thereby obtain a recording layer precursor. This precursor was dried in an oven (80° C.) and further heated for 15 minutes on a plate heated to 200° C. to thereby form a recording layer having a thickness of about 0.5 μm. Thus, there was obtained a recording medium (our product 8) of the type shown in FIG. 3.

Example 9

| 5% aqueous polyacrylamide solution | 10 g |
|---|---|
| Silver potassium cyanide | 0.3 g |
| 35% formalin solution | 0.2 ml |

The solution having the above composition was coated on a glass substrate by means of a doctor blade to thereby obtain a recording layer precursor. This precursor was dried in an oven maintained at 120° C. and further heated for 5 minutes in a high temperature furnace heated to 250° C. to thereby form a recording layer having a thickness of about 1.2 μm. Thus, there was obtained a recording medium (our product 9) of the type shown in FIG. 3.

Example 10

| Polyvinyl alcohol | 0.5 g |
|---|---|
| Water | 9 g |
| Silver nitrate | 0.3 g |
| 28% ammonia water | 1 ml |
| Rochelle salt | 0.4 g |

The solution having the above composition was coated on a glass substrate by dipping to thereby obtain a recording layer precursor. This precursor was dried in an oven maintained at 60° C. and further heated for 15 minutes on a plate heated to 200° C. to thereby form a recording layer having a thickness of about 0.5 μm. Thus, there was obtained a recording medium (our product 10) of the type shown in FIG. 3.

Example 11

| Polyvinyl alcohol | 1 g |
|---|---|
| Water | 9 g |
| Silver nitrate | 1 g |
| 28% ammonia water | 2 ml |
| Grape sugar | 1 g |

The solution having the above composition was coated on a glass substrate by rotation-coating method to thereby obtain a recording layer precursor. This precursor was dried in an oven maintained at 80° C. and further heated for 15 minutes on a plate heated to 150° C. to thereby form a recording layer having a thickness of about 0.8 μm. Thus, there was obtained a recording medium (our product 11) of the type shown in FIG. 3.

Example 12

| | |
|---|---|
| Polyvinyl alcohol | 1 g |
| Water | 9 g |
| Silver nitrate | 0.5 g |
| 28% ammonia water | 0.5 ml |
| 35% formalin solution | 0.1 ml |

The solution having the above composition was coated on an optically polished glass plate by rotation-coating method to thereby obtain a recording layer precursor. This precursor was dried at 80° C. and thereafter heated for 10 minutes on a plate heated to 180° C. to thereby form a recording layer having a thickness of about 0.8 μm. Thus, there was obtained a recording medium (our product 12) of the type shown in FIG. 3.

Example 13

The 10% methylene chloride solution of polycarbonate resin was coated on the glass substrate used in Example 12 and dried to thereby form an undercoat having a thickness of about 2 μm. Thereafter, a recording layer was formed on this undercoat in the same manner as Example 12. Thus, there was obtained a recording medium (our product 13) of the type shown in FIG. 4.

Example 14

The exactly same procedure as Example 13 was repeated except that the polycarbonate resin used therein was replaced by polysulfone and polyimide respectively to thereby obtain recording mediums (our products 14 and 14').

Example 15

| | |
|---|---|
| Polyvinyl pyrrolidone | 3 g |
| Water | 7 g |
| Gold potassium cyanide | 0.5 g |
| Potassium hypophosphite | 0.16 g |

The solution having the above composition was coated on a 1.5 mm-thick acrylic plate by rotation-coating method to thereby obtain a recording layer precursor. This precursor was dried at 90° C. and thereafter heated for 10 minutes in an oven heated to 120° C. to thereby form a recording layer having a thickness of about 1.2 μm. Thus, there was obtained a recording medium (our product 15) of the type shown in FIG. 3.

Example 16

The exactly same procedure as Example 15 was repeated except that the acrylic plate used therein was replaced by 2 mm-thick polysulfone resin and polyimide plates respectively. Thus, there were obtained recording mediums (our products 16 and 16'). In this instance, the drying temperature used for the formation of a recording layer was 90° C. and the heating temperature for that purpose was 180° C. These products 16 and 16' according to the present invention are of the type shown in FIG. 3.

Example 17

| | |
|---|---|
| Polyvinyl alcohol | 1 g |
| Water | 9 g |
| Silver nitrate | 1 g |
| 28% ammonia water | 1 ml |
| 35% formalin solution | 0.1 ml |

The solution having the above composition was coated on a glass substrate by means of rotation-coating method to thereby obtain a recording layer precursor. This precursor was dried in an oven maintained at 60° C. and further heated for 10 minutes on a plate maintained at 250° C. to thereby form an about 1.0 μm-thick recording layer. Thus, there was obtained a recording medium (our product 17) of the type shown in FIG. 5.

Example 18

| | |
|---|---|
| Polyvinyl pyrrolidone | 2 g |
| Water | 8 g |
| Silver potassium cyanide | 2 g |
| Grape sugar | 1.5 g |

The solution having the above composition was coated on a glass substrate by means of rotation-coating method to thereby obtain a recording layer precursor. This precursor was dried in an oven maintained at 80° C. and further heated for 25 minutes on a plate maintained at 150° C. to thereby form an about 1.2 μm-thick recording layer. Thus, there was obtained a recording medium (our product 18) of the type shown in FIG. 5.

Example 19

| | |
|---|---|
| Polyvinyl pyrrolidone | 2 g |
| Water | 8 g |
| Gold potassium cyanide | 0.4 g |
| Sodium tartrate | 0.3 g |

The solution having the above composition was coated on a glass substrate to thereby obtain a recording layer precursor. This precursor was dried in an oven maintained at 120° C. and further heated for 10 minutes in a high temperature furnace maintained at 350° C. to thereby form an about 1.0 μm-thick recording layer. Thus, there was obtained a recording medium (our product 19) of the type shown in FIG. 5.

Example 20

| | |
|---|---|
| 5% aqueous polyacrylamide solution | 10 g |
| Silver nitrate | 1.5 g |
| Sodium boron hydride | 0.4 g |

The solution having the above composition was coated on a glass substrate to thereby obtain a recording layer precursor. This precursor was dried in an oven maintained at 60° C. and further heated for 5 minutes on a plate heated to 200° C. to thereby form an about 1.2 μm-thick recording layer. Thus, there was obtained a recording medium (our product 20) of the type shown in FIG. 5.

Example 21

| | |
|---|---|
| Polyvinyl alcohol | 1 g |
| Copper sulfate | 0.6 g |
| 28% ammonia water | 2 ml |
| Rochelle salt | 1 g |

The solution having the above composition was coated on a glass substrate to thereby obtain a recording shown in FIGS. 3 and 4 and (c') by radiating said laser beam from each of the surface and substrate sides.

TABLE I

|  | Reflectance (%) | Absorptance (%) | Recording energy (nJ/bit) | Spot diameter (μm) |
|---|---|---|---|---|
| Our product 1 | 45 | 40 | 5.6 | 1.0 |
| Our product 2 | 34 | 36 | 7.0 | 0.9 |
| Our product 3 | 30 | 40 | 5.0 | 1.0 |
| Our product 4 | 42 | 35 | 4.2 | 1.1 |
| Our product 5 | 51 | 38 | 3.0 | 0.8 |
| Our product 6 | 36 | 35 | 15.4 | 0.8 |
| Our product 7 | 28 | 53 | 10.2 | 1.2 |
| Our product 8 | 40 | 36 | 11.7 | 0.9 |
| Our product 9 | 41 | 47 | 13.8 | 0.8 |
| Our product 10 | 36 | 34 | 8.4 | 0.9 |
| Our product 11 | 39 | 40 | 11.0 | 1.0 |
| Our product 12 | 30 | 45 | 15.4 | 0.8 |
| Our product 13 | 27 | 46 | 10.5 | 0.9 |
| Our product 15 | 24 | 38 | 11.9 | 1.0 |
| Our product 16 and 16' | 29 | 40 | 9.8 | 0.9 |
| Our product 17 | (substrate side) 30 (surface side) 40 | (substrate side) 60 (surface side) 50 | (substrate side) 14.0 (surface side) 6.3 | (substrate side) 0.8 (surface side) 0.8 |
| Our product 18 | (substrate side) 32 (surface side) 35 | (substrate side) 41 (surface side) 39 | (substrate side) 17.5 (surface side) 7.4 | (substrate side) 1.0 (surface side) 1.0 |
| Our product 19 | (substrate side) 34 (surface side) 41 | (substrate side) 48 (surface side) 40 | (substrate side) 12.0 (surface side) 6.5 | (substrate side) 0.9 (surface side) 0.7 |
| Our product 20 | (substrate side) 36 (surface side) 38 | (substrate side) 40 (surface side) 38 | (substrate side) 14.0 (surface side) 7.4 | (substrate side) 0.8 (surface side) 0.9 |
| Our product 21 | (substrate side) 29 (surface side) 36 | (substrate side) 50 (surface side) 44 | (substrate side) 19.0 (surface side) 10.0 | (substrate side) 0.7 (surface side) 0.8 |

Note
The results obtained from our products 14 and 14' were observed to be substantially the same as those obtained from our product 13.

layer precursor. This precursor was dried in an oven heated to 100° C. and further heated for 15 minutes in a high temperature furnace heated to 300° C. to thereby form an about 1.0 μm-thick recording layer. Thus, there was obtained a recording medium (our product 21) of the type shown in FIG. 5.

The reflectance and absorptance of these recording mediums in near-infrared radiation were summarized in Table-1. In this regard, it is to be noted that these are values measured (a) from the surface side in the case of recording mediums of the type shown in FIGS. 1 and 2, (b) from the substrate side in the case of recording mediums of the type shown FIGS. 3 and 4 and (c) from each of surface and substrate sides in the case of the recording medium of the type shown in FIG. 5.

In addition thereto, the results obtained by recording these recording mediums using He-Ne laser beam under the conditions: radiation surface energy 7 mW and beam diameter 2.4 μm were also summarized in Table-1. In this connection, it is to be noted that the recording referred to herein was carried out respectively (a') by radiating said laser beam from the surface side in the case of the recording mediums of the type shown in FIGS. 1 and 2, (b') by radiating said laser beam from the substrate side in the case of the recording mediums

We claim:
1. An optical information recording medium comprising a substrate and a recording layer superimposed on said substrate, said recording layer consisting of a reflective sub-layer and a light absorptive sub-layer formed on said reflective sub-layer, said reflective sub-layer containing closely distributed therein metal particles having a particle diameter of 1500 Angstroms or less and wherein said metal particles occupy from 60 to 98% of the area of the surface of said reflective sub-layer, said light absorptive sub-layer being made of a resin containing particles of metal compound and a very small amount of metal substantially uniformly dispersed therein, said particles of metal compound and metal in said light absorptive sub-layer having a particle size in the range of from 200 to 2000 Angstroms, the sum of the amounts of said particles of metal compound and metal in said light absorptive sub-layer being in the range of from 1 to 30 volume %, based on the volume of said light absorptive sub-layer.

2. A recording medium according to claim 1 wherein said substrate is composed of polysulfone or polyimide.

3. A recording medium according to claim 1 wherein said reflective sub-layer is located on the side of said recording layer that is remote from said substrate and said light absorptive sub-layer is located on the side of said recording layer that is closest to said substrate.

4. A recording medium according to claim 3 wherein on said reflective sub-layer is further superimposed an overcoat that is capable of permeating a high density energy beam, is superior in mechanical strength, does not react with the reflective sub-layer and is of a superior film formability.

5. A recording medium according to claim 3 wherein an undercoat is interposed between said light absorptive sub-layer and said substrate.

6. A recording medium according to claim 1 wherein said reflective sub-layer is located on the side of said recording layer that is closest to said substrate and said light absorptive sub-layer is located on the side of said recording layer that is remote from said substrate.

7. A recording medium according to claim 6 wherein between said reflective sub-layer and said substrate is interposed an undercoat that is capable of permeating a high density energy beam, does not react with the reflective sub-layer, is superior in the film formablility and is of reduced thermal conductivity.

8. A recording medium according to claim 1 wherein an overcoat is further superimposed on said reflective sub-layer located on the side of said recording layer that is remote from said substrate.

9. A recording medium according to claim 1 wherein an undercoat is interposed between said substrate and said reflective sub-layer located on the side of said recording layer that is closest to said substrate.

10. A recording medium according to claim 1 in which said metal particles in said reflective sub-layer have particle diameters in the range of 150 to 1500 Angstroms and the average particle size thereof is about 500 Angstroms.

11. An optical information recording medium comprising a substrate and a recording layer superimposed on said substrate, said recording layer consisting of a pair of reflective sub-layers and a light absorptive sub-layer disposed between said reflective sub-layers, said reflective sub-layers each containing closely distributed therein metal particles having a particle diameter of 1500 Angstroms or less and wherein said metal particles occupy from 60 to 90% of the area of the surface of said reflective sub-layers, said light absorptive sub-layer being made of a resin containing particles of metal compound and a very small amount of metal substantially uniformly dispersed therein, said particles of metal compound and metal in said light absorptive sub-layer having a particle size in the range of from 200 to 2000 Angstroms, the sum of the amounts of said particles of metal compound and metal in said light absorptive sub-layer being in the range of from 1 to 30 volume %, based on the volume of said light absorptive sub-layer.

12. A recording medium according to claim 11 in which said metal particles in said reflective sub-layer have particle diameters in the range of 150 to 1500 Angstroms and the average particle size thereof is about 500 Angstroms.

13. A recording medium according to claim 1 in which said metal particles occupy from 70 to 90% of the area of the surface of said reflective sub-layer, and the sum of the amounts of said particles of metal compound and metal in said light absorptive sub-layer is in the range of from 2 to 10 volume %, based on the volume of said light absorptive sub-layer.

* * * * *

UNITED STATES PATENT AND TRADEMARK OFFICE
CERTIFICATE OF CORRECTION

PATENT NO. : 4 477 555
DATED : October 16, 1984
INVENTOR(S) : Hideaki Oba et al

It is certified that error appears in the above-identified patent and that said Letters Patent is hereby corrected as shown below:

Column 15, line 22; change "formablility" to
---formability---.
Column 15, line 24; change "claim 1" to ---claim 11---.
Column 15, line 28; change "claim 1" to ---claim 11---.
Column 16, line 11; change "90%" to ---98%---.

Signed and Sealed this

Eleventh Day of June 1985

[SEAL]

Attest:

DONALD J. QUIGG

Attesting Officer  Acting Commissioner of Patents and Trademarks